Oct. 30, 1928.

I. F. STRAND 1,689,412

BRAKE

Filed April 8, 1927

Inventor

I.F.Strand,

By Clarence A O'Brien
Attorney

Patented Oct. 30, 1928.

1,689,412

UNITED STATES PATENT OFFICE.

IRWIN F. STRAND, OF BENSON, MINNESOTA.

BRAKE.

Application filed April 8, 1927. Serial No. 182,165.

The present invention relates to improvements in a brake for use upon motor vehicles and has for its principal object to provide a brake which is of such construction as to at all times be positive and efficient in its braking action.

One of the important objects of the present invention is to provide a vehicle brake wherein an annular braking block is supported in the brake shoe, the block being constructed of such material as to prevent slippage of the brake band therearound.

A further object of the invention is to provide a vehicle brake which is simple in construction, inexpensive, and furthermore adapted to the purposes for which the same is designed.

Other objects and advantages of this invention will become apparent during the course of the following description.

In the accompanying drawing forming part of this specification and in which like numerals are employed to designate like parts throughout the same:

Figure 1:
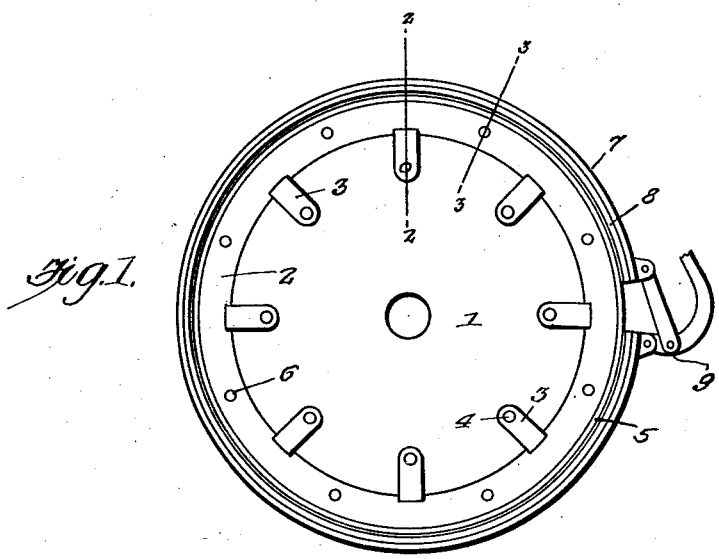
Figure 1 is a side elevation of a vehicle brake embodying my invention.
Figure 2:
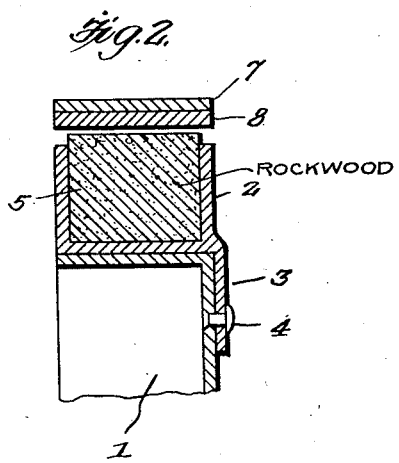
Figure 2 is a sectional view taken approximately on the line 2—2 of Figure 1.

In the drawing, whence for the purpose of illustration is shown the preferred embodiment of my invention, the numeral 1 designates the brake drum and supported on the outer peripheral face of this drum is the channel shaped brake shoe 2. A series of inwardly extending fingers or lugs are formed on one side of the channel shaped shoe 2 and these lugs are secured to the side of the drum, by any appropriate fastening means such as is shown at 4. In this manner, the channel shaped shoe will be rigidly secured on the drum for rotation therewith.

Figure 3:
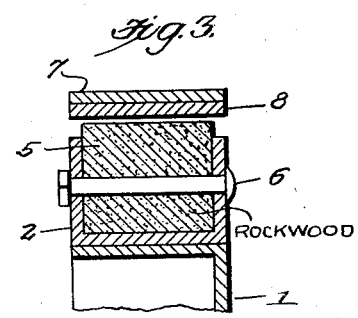
Figure 3 is a similar section taken on the line 3—3 of Figure 1.

The brake block 5 forming the salient feature of the present invention is in the form of an annulus and is supported within the channel shaped shoe 2. Securing bolts 6 extend transversely through the sides of the channel shaped shoe 2 and the intermediate portion of the annular block 5 in the manner clearly shown in Figure 3.

The outer peripheral portion of the brake block 5 projects beyond the outer edges of the sides of the channel shaped shoe 2 and this is clearly illustrated in the several figures of the drawing. This brake block is preferably formed of a brown compact variety of asbestos, resembling fossil wood and known as rock wood and I provide a brake member of this particular material, the same will be strong and durable and furthermore will prevent slippage of the brake band around the outer peripheral face of the annular brake block 5 when the brake is applied.

The brake band is shown at 7 and the brake lining is secured to the inner face thereof as indicated at 8. This brake band and lining is of conventional construction, the brake band being split and the usual attracting means designated by the numeral 9 is provided whereby the ends of the brake band may be contracted for applying the brake in a manner well known in the art.

While I have shown the preferred embodiment of my invention, it is to be understood that various changes in size, shape and arrangement of parts may be resorted to without departing from the spirit or sacrificing any of the advantages of the appended claims.

What I claim is:

1. In a vehicle brake, a shoe, a drum, a channel shaped shoe encircling the drum, inwardly extending lugs formed on the channel shaped shoe and secured to the side of the drum, an annular brake block arranged within the shoe, the outer peripheral portion of the block projecting beyond the outer edges of the sides of the channel shaped shoe, and securing bolts extending transversely through the sides of the shoe and said block.

2. In a vehicle brake, a shoe, a drum, a channel shaped shoe encircling the drum, inwardly extending lugs formed on the channel shaped shoe and secured to the side of the drum, an annular brake block arranged within the shoe, the outer peripheral portion of the block projecting beyond the outer edges of the sides of the channel shaped shoe, and securing bolts extending transversely through the sides of the shoe and said block, said block being constructed of a compact variety of asbestos resembling fossil wood.

In testimony whereof I affix my signature.

IRWIN F. STRAND.